(12) United States Patent
Sabu et al.

(10) Patent No.: US 12,337,791 B2
(45) Date of Patent: Jun. 24, 2025

(54) FASTENING STRUCTURE OF A BELT ANCHOR

(71) Applicant: TOYOTA JIDOSHA KABUSHIKI KAISHA, Aichi-ken (JP)

(72) Inventors: Akira Sabu, Toyota (JP); Kazuya Ueda, Toyota (JP); Yusuke Asai, Nagakute (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/915,353

(22) Filed: Oct. 15, 2024

(65) Prior Publication Data
US 2025/0128674 A1   Apr. 24, 2025

(30) Foreign Application Priority Data

Oct. 18, 2023   (JP) .................................. 2023-179464

(51) Int. Cl.
*B60R 22/22*   (2006.01)
(52) U.S. Cl.
CPC .................................... *B60R 22/22* (2013.01)

(58) Field of Classification Search
CPC .. B60R 22/18; B60R 2022/1806; B60R 22/22
See application file for complete search history.

(56) References Cited

U.S. PATENT DOCUMENTS 5,344,188 A * 9/1994 Mims ...................... B60R 22/22
                                                          280/808

FOREIGN PATENT DOCUMENTS

| EP | 2239185 A1 * | 10/2010 | ............. B60K 15/06 |
| JP | 2010-030462 A | 2/2010 | |
| KR | 0130149 Y1 * | 12/1998 | ............. B60R 22/02 |

* cited by examiner

*Primary Examiner* — Paul N Dickson
*Assistant Examiner* — Matthew D Lee
(74) *Attorney, Agent, or Firm* — HAUPTMAN HAM, LLP

(57) ABSTRACT

The fastening structure of a belt anchor comprises: the belt anchor provided at one end of a buckle of a seat belt; a floor panel; an anchor bracket joined to the floor panel; and a tank bracket to which a fuel tank is fastened and which is joined to the floor panel, wherein the belt anchor is fastened together with the floor panel, the anchor bracket, and the tank bracket.

4 Claims, 5 Drawing Sheets

FASTENING STRUCTURE OF A BELT ANCHOR

CROSS REFERENCE TO RELATED APPLICATION

This application claims priority to Japanese Patent Application No. 2023-179464 filed on Oct. 18, 2023, which is incorporated herein by reference in its entirety including the specification, claims, drawings, and abstract.

TECHNICAL FIELD

This specification discloses a fastening structure of a belt anchor provided in a seat belt buckle.

BACKGROUND

A seat belt device of a vehicle includes a belt-shaped belt main body and a buckle fixed to a floor panel. A tongue plate connectable to the buckle is attached to the belt main body. By connecting the tongue plate to the buckle, the upper body of the occupant is restrained by the belt main body. A belt anchor is fixed to the buckle. The belt anchor is screwed to the floor panel. Patent Document 1 discloses such a seat belt device.

However, in the case of the conventional seat belt device, the strength of the panel material around the fastening portion of the belt anchor is not sufficient. Therefore, when a strong tensile force is applied to the seat belt, the panel material around the fastening portion of the belt anchor is deformed, and the belt anchor is displaced in some cases.

Therefore, this specification discloses the fastening structure of the belt anchor capable of more effectively suppressing displacement of the belt anchor.

CITATION LIST

PATENT DOCUMENT 1: JP. 2010-030462 A

SUMMARY

A fastening structure of a belt anchor disclosed herein comprises: the belt anchor provided at one end of a buckle of a seat belt; a floor panel; an anchor bracket joined to the floor panel; and a tank bracket to which a fuel tank is fastened and which is joined to the floor panel, wherein the belt anchor is fastened together with the floor panel, the anchor bracket, and the tank bracket.

In this case, the floor panel, the anchor bracket, and the tank bracket may be stacked in this order from an upper part toward a lower part, and the tank bracket may have a bead that is adjacent to the fastening portion of the belt anchor and that extends in a front-rear direction.

The tank bracket may comprise: a main bracket having a substantially box shape and protruding downward from floor panel; and a support bracket, the support bracket may comprise: a skirt portion that overlaps a circumferential surface of the main bracket and that is joined to the main bracket; and a flange portion that extends in a direction parallel to the floor panel and that overlaps the anchor bracket and the floor panel, wherein a part of the flange portion may be separated from the floor panel and forms a space with the floor panel.

The fastening structure may further comprise: a cross member which extends in a vehicle width direction and which forms a cross space which is a closed space with the floor panel; and a bulk disposed in the cross space and spanned between a front wall of the cross member and a rear wall of the cross member, wherein the tank bracket may be joined to the cross member, and the bulk may be adjacent to the tank bracket in the front-rear direction.

The tank bracket may be located on the front side of the cross member, a front end position of the anchor bracket may be substantially the same as a front end position of the tank bracket, and a distance L2 from the fastening portion with the belt anchor to a front end of the main bracket may substantially equal to a distance L1 from the fastening portion to the front end of the tank bracket.

According to the fastening structure of the belt anchor disclosed in this specification, since the rigidity around the fastening portion is improved, the displacement of the belt anchor is effectively suppressed.

BRIEF DESCRIPTION OF DRAWINGS

Embodiment(s) of the present disclosure will be described based on the following figures, wherein.

DESCRIPTION OF EMBODIMENT

Figure 1:
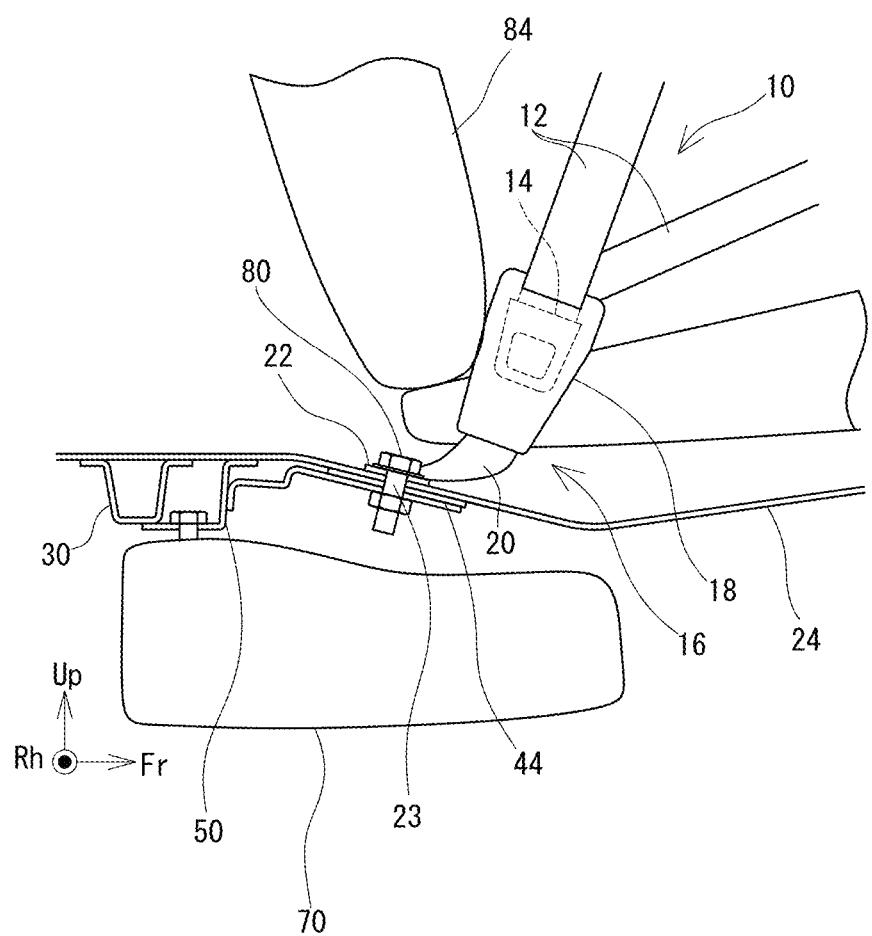
FIG. 1 is a schematic view of the periphery of a belt anchor of a seat belt apparatus.

Hereinafter, a fastening structure of the belt anchor 22 will be described with reference to the drawings. FIG. 1 is a schematic view of the periphery of a belt anchor 22 of a seat belt device 10. In the drawings, Fr, Up, and Rh indicate the front, upper, and right sides of the vehicle, respectively.

The seat belt device 10 shown in FIG. 1 is a three-point seat belt device attached to a rear seat 84 of a vehicle. The seat belt device 10 is roughly divided into a belt main body 12 and a buckle 16. The belt main body 12 is a belt-shaped member that restrains the upper body of the occupant. One end of the belt main body 12 is set in a winder (not shown). The belt main body 12 is connected to a buckle 16 via a tongue plate 14.

The buckle 16 is a member that is fixed to the vehicle body and to which the tongue plate 14 is coupled. The buckle 16 includes a buckle main body 18, a connecting band 20, and a belt anchor 22. The buckle main body 18 is a portion connected to the tongue plate 14. An insertion opening into which the tongue plate 14 is inserted is formed in an upper end surface of the buckle main body 18. A connecting band 20 extends from a lower end of the buckle main body 18, and a belt anchor 22 is fixed to a terminal end of the connecting band 20. The belt anchor 22 is a metal plate for fixing the buckle 16 to the vehicle body. The belt anchor 22 is superposed on the floor panel 24 and fastened to the floor panel 24 by fastening bolts 80. Hereinafter, a portion to which the belt anchor 22 is fastened is referred to as a "fastening portion 23".

Here, when the vehicle suddenly stops or decelerates while the occupant wears the seat belt, the occupant tries to move forward with respect to the vehicle. As a result, the belt main body 12 is strongly pulled toward the front of the vehicle. As the belt main body 12 is pulled, a large upward force is applied to the fastening portion 23 of the belt anchor 22. Upon receiving this force, deformation occurs around the fastening portion 23, and the belt anchor 22 is displaced. When the restraining position of the occupant by the belt main body 12 is changed by the displacement of the belt anchor 22, the occupant may not be properly restrained. Therefore, in this example, the belt anchor 22 is fastened together with the floor panel 24, the anchor bracket 44, and the tank bracket 50. Hereinafter, this will be described in detail.

Figure 2:
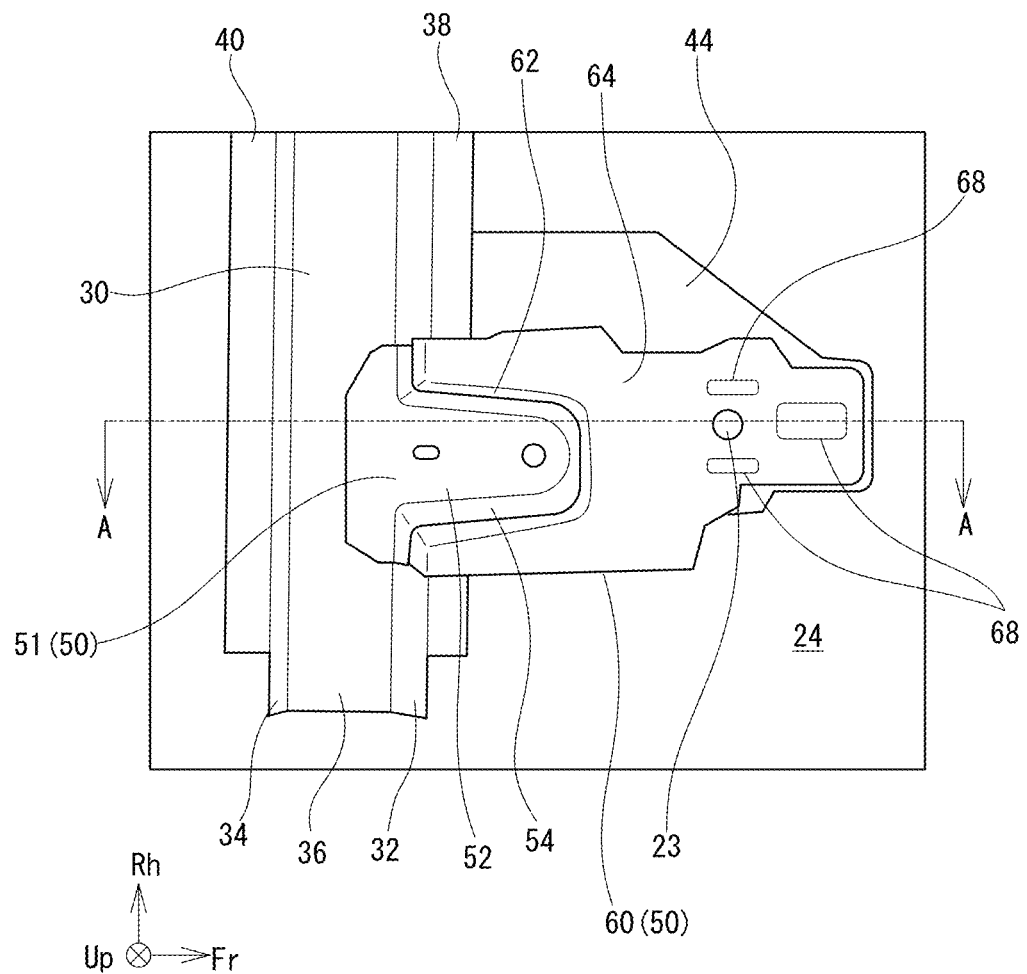
FIG. 2 is a bottom view of the vicinity of a fastening portion.
Figure 3:
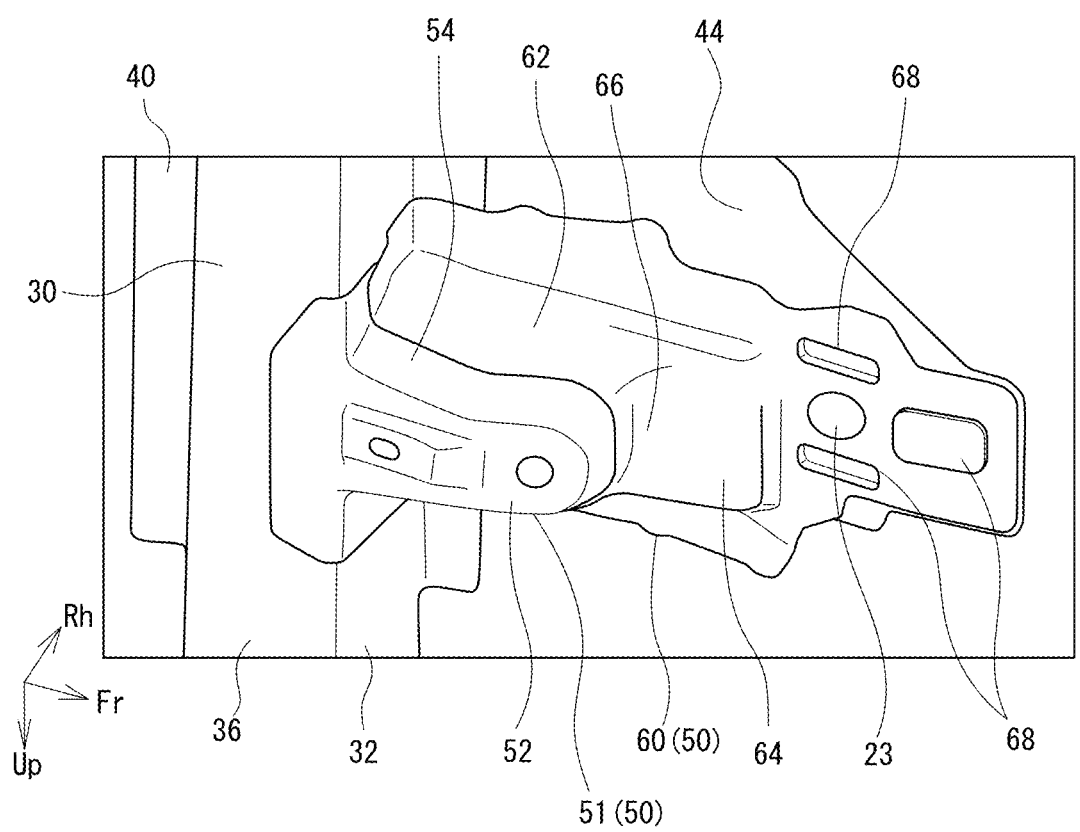
FIG. 3 is a perspective view of the vicinity of the fastening portion as viewed from the vehicle lower side.
Figure 4:
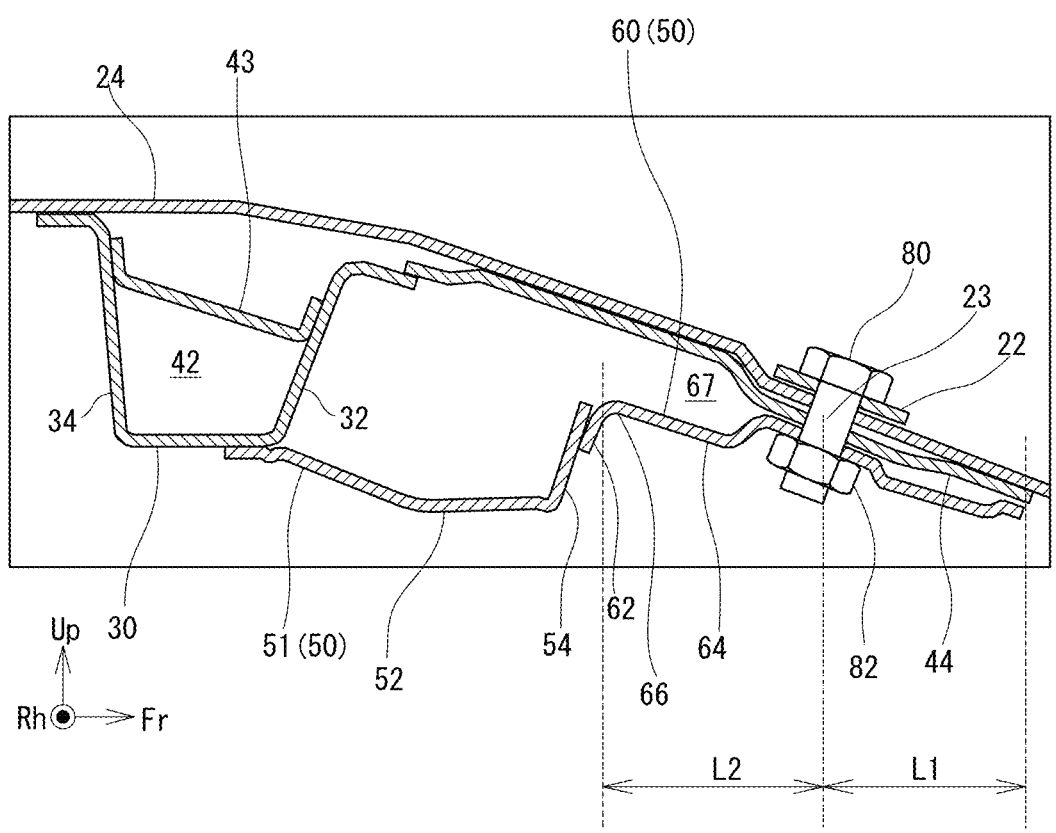
FIG. 4 is a cross-sectional view taken along line A-A in FIG. 2.

FIG. 2 is a bottom view of the vicinity of the fastening portion 23, and FIG. 3 is a perspective view of the vicinity of the fastening portion 23 as viewed from the vehicle lower side. FIG. 4 is a cross-sectional view taken along line A-A in FIG. 2. As shown in FIG. 1, a fuel tank 70 is disposed below the fastening portion 23, but the fuel tank 70 is not shown in FIGS. 2 to 4.

As shown in FIGS. 2 to 4, a cross member 30 is fixed to the lower surface of the floor panel 24. The cross member 30 is a frame member extending in the vehicle width direction. In the present example, the cross member 30 has a substantially hat-shaped cross section that opens upward. That is, the cross member 30 has front and rear walls 32 and 34, a bottom wall 36, and front and rear flanges 38 and 40. The front and rear flanges 38, 40 are joined to the floor panel 24. Thus, a closed space 42 (see FIG. 4) extending in the vehicle width direction is formed between the cross member 30 and the floor panel 24. Hereinafter, this closed space is referred to as a "cross space 42".

As shown in FIG. 4, a bulk 43 spanning the front wall 32 and the rear wall 34 is disposed in the cross space 42. The bulk 43 is a metallic sheet metal part. The position of the bulk 43 in the vehicle width direction is substantially the same as the position of the tank bracket 50 described later in the vehicle width direction. The front end of the bulk 43 is joined to the front wall 32 of the cross member 30, and the rear end of the bulk 43 is joined to the rear wall 34 of the cross member 30. By providing the bulk 43, deformation of the cross member 30 is effectively suppressed.

A tank bracket 50 is disposed on the front side of the cross member 30. The tank bracket 50 is a bracket to which the fuel tank 70 is fastened. The tank bracket 50 is roughly divided into a main bracket 51 and a support bracket 60.

As shown in FIGS. 3 and 4, the main bracket 51 is a substantially box-shaped member protruding downward from the floor panel 24. The main bracket 51 includes a bottom wall 52 and a circumferential wall 54. A part of the bottom wall 52 is joined to the bottom wall 36 of the cross member 30. A part of the circumferential wall 54 is bent along the front wall 32 of the cross member 30 and joined to the front wall 32.

The support bracket 60 is a bracket that couples the main bracket 51 and the floor panel 24. The support bracket 60 is roughly divided into a skirt portion 62 and a flange portion 64. The skirt portion 62 overlaps the circumferential wall 54 of the main bracket 51 and is coupled to the circumferential wall 54. The flange portion 64 extends in a direction substantially parallel to the floor panel 24 and is joined to the floor panel 24. Here, as is clear from FIGS. 3 and 4, the flange portion 64 is separated from the floor panel 24 in the vicinity of the fastening portion 23 from the front end of the main bracket 51, and a space 67 is formed between the flange portion 64 and the floor panel 24. By forming the space 67, stress concentration in the connecting portion 66 (see FIGS. 3 and 4) from the skirt portion 62 to the flange portion 64 is alleviated, and deformation of the support bracket 60 is effectively suppressed.

As is clear from FIGS. 2 to 4, the flange portion 64 extends to a position where it sufficiently overlaps the fastening portion 23. More precisely, as shown in FIG. 4, a distance L1 from the fastening portion 23 to the front end of the flange portion 64 is substantially equal to a distance L2 from the fastening portion 23 to the rear end of the main bracket 51. As shown in FIG. 3, a plurality of beads 68 are formed in the flange portion 64 in the vicinity of the fastening portion 23. With this configuration, deformation of the panel material around the fastening portion 23 can be suppressed.

An anchor bracket 44 is further provided around the fastening portion 23. The anchor bracket 44 is a reinforcing panel member for reinforcing the periphery of the fastening portion 23. As shown in FIGS. 3 and 4, the anchor bracket 44 is a panel member disposed between the floor panel 24 and the support bracket 60 and joined to the floor panel 24. The front end position of the anchor bracket 44 is substantially the same as the front end position of the support bracket 60.

Here, as is clear from FIGS. 2 to 4 and as described above, the flange portion 64 of the support bracket 60 extends to a position where it completely overlaps with the fastening portion 23. As a result, in the fastening portion 23, the belt anchor 22, the floor panel 24, the anchor bracket 44, and the support bracket 60 overlap in this order. In this example, fastening holes are formed in the four metal plates 22, 24, 44, and 60, and the four metal plates 22, 24, 44, and 60 are fastened together by fastening bolts 80. In order to facilitate this fastening, a weld nut 82 (see FIG. 4) screwed with the fastening bolt 80 is welded around the fastening hole of the flange portion 64. That is, according to the present example, the four metal plates 22, 24, 44, and 60 are stacked and fastened to each other around the fastening portion 23 of the belt anchor 22. As a result, the strength around the fastening portion 23 can be improved, and deformation around the fastening portion 23 can be effectively suppressed.

Figure 5:
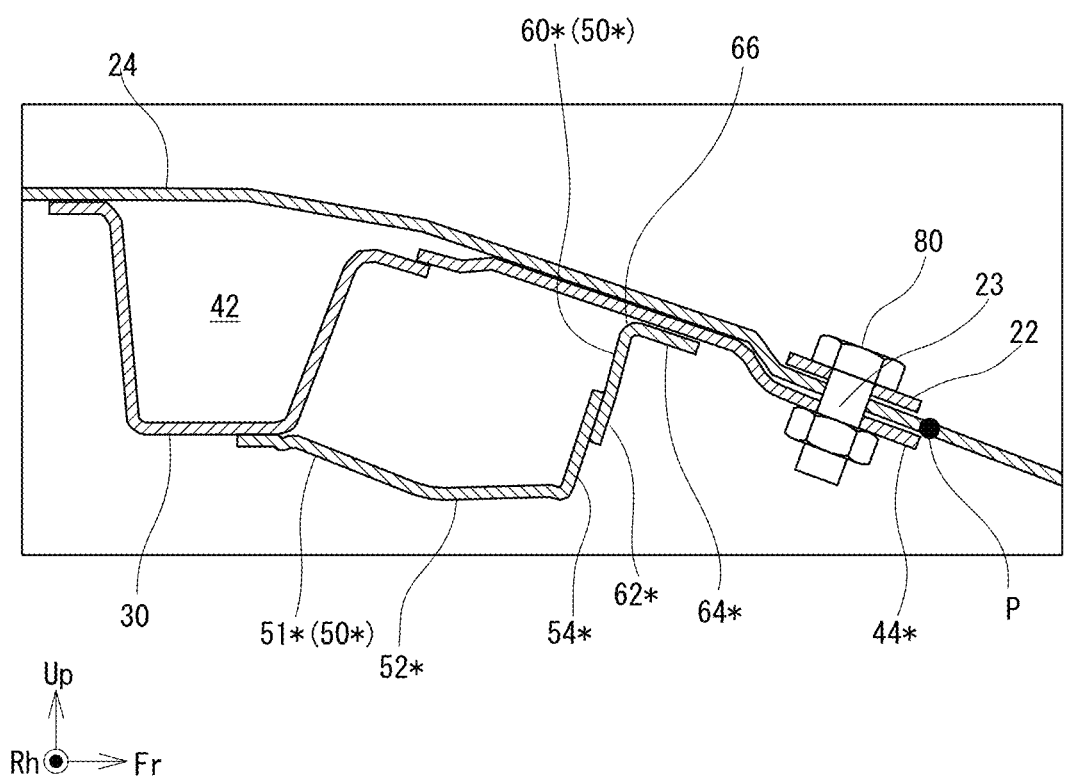
FIG. 5 is a cross-sectional view of a fastening structure of a comparative example.

Next, the effect of the fastening structure will be described in comparison with a comparative example. FIG. 5 is a cross-sectional view of a fastening structure of a comparative example. In the comparative example, the support bracket 60* is small and does not reach the fastening portion 23. Therefore, in the case of the comparative example, only three metal plates of the belt anchor 22, the floor panel 24, and the anchor bracket 44* are stacked in the fastening portion 23. In this case, the rigidity around the fastening portion 23 becomes poor, and deformation around the fastening portion 23 and displacement of the belt anchor 22 are likely to occur.

In addition, in the case of the comparative example, the front end of the anchor bracket 44* is located in the vicinity of the fastening portion 23, and further in the vicinity of the front end of the belt anchor 22. In this case, stress concentrates on a point P of the floor panel 24 in the vicinity of the front end of the anchor bracket 44*, and deformation of the floor panel 24 is likely to occur.

In addition, in the case of the support bracket 60* of the comparative example, most of the flange portion 64* is close to the floor panel 24. In other words, in the case of the support bracket 60* of the comparative example, the space 67 is not formed between the flange portion 64* and the floor panel 24. As a result, the rigidity of the support bracket 60* itself becomes poor, and deformation of the support bracket 60* and the floor panel 24 to which the support bracket 60* is joined easily occurs. The deformation of the floor panel 24 facilitates the displacement of the belt anchor 22.

On the other hand, the support bracket 60 disclosed in the present specification completely wraps the fastening portion 23, as described above. As a result, the four metal plates 22, 24, 44, and 60 are stacked in the fastening portion 23. As a result, deformation around the fastening portion 23 is effectively suppressed. In addition, in this example, both the support bracket 60 and the anchor bracket 44 extend to a position sufficiently away from the fastening portion 23. With this configuration, stress is less likely to concentrate around the fastening portion 23, and deformation of the floor panel 24 and displacement of the belt anchor 22 are effectively suppressed.

As described above, the bead 68 is formed around the fastening portion 23 of the flange portion 64. A part of the flange portion 64 is separated from the floor panel 24, and a space 67 is formed between the flange portion 64 and the floor panel 24. With this configuration, the rigidity of the flange portion 64 is increased, and the deformation of the flange portion 64 and the displacement of the belt anchor 22 can be effectively suppressed.

Further, in this example, a bulk 43 for reinforcing the cross member 30 is provided adjacent to the tank bracket 50. With this configuration, deformation of the cross member 30 and the tank bracket 50 can be effectively suppressed. As a result, the displacement of the belt anchor 22 can also be effectively suppressed.

Here, as is clear from the description so far, in the present example, only the shapes of the anchor bracket 44 and the support bracket 60 are changed as compared with the comparative example. In other words, in this example, a dedicated component is not added in order to suppress the displacement of the belt anchor 22. As a result, the displacement of the belt anchor 22 is effectively suppressed, and an increase in the number of parts is suppressed. Each of the anchor bracket 44 and the support bracket 60 to be reshaped is a small component. In other words, the configurations of the floor panel 24 and the cross member 30, which are large-sized parts, are not changed. Therefore, the influence on the entire vehicle can be suppressed to be small. In this example, the shape of the main bracket 51 is not significantly changed. Therefore, the mountability of the fuel tank 70 can be maintained in the same manner as in the related art.

It should be noted that all of the configurations described so far are examples, and other configurations may be modified as long as the configuration described in claim 1 is provided. For example, the shape and size of the support bracket 60 may be appropriately changed as long as it overlaps the fastening portion 23.

REFERENCE SIGNS LIST 10 seat belt device, 12 belt main body, 14 tongue plate, 16 buckle, 18 buckle main body, 20 connecting band, 22 belt anchor, 23 fastening portion, 24 floor panel, 30 cross member, 42 cross space, 43 bulk, 44, 44* anchor bracket, 50 tank bracket, 51 main bracket, 52 bottom wall, 54 circumferential wall, 60, 60* support bracket, 62 skirt portion, 64, 64* flange portion, 66 connecting portion, 68 bead, 70 fuel tank, 80 fastening bolt, 82 weld nut, 84 rear seat.

The invention claimed is:

1. A fastening structure, comprising:
   a belt anchor provided at one end of a buckle of a seat belt;
   a floor panel;
   an anchor bracket joined to the floor panel; and
   a tank bracket to which a fuel tank is fastened and which is joined to the floor panel,
   wherein a fastening portion of the belt anchor is fastened together with the floor panel, the anchor bracket, and the tank bracket,
   the floor panel, the anchor bracket, and the tank bracket are stacked in this order from an upper part toward a lower part of the fastening structure, and
   the tank bracket has a bead that is adjacent to the fastening portion of the belt anchor and that extends in a front-rear direction.

2. The fastening structure according to claim 1, wherein the tank bracket comprises:
   a main bracket protruding downward from floor panel; and
   a support bracket, and
   the support bracket comprises:
   a skirt portion that overlaps a circumferential surface of the main bracket and that is joined to the main bracket; and
   a flange portion that extends in a direction parallel to the floor panel and that overlaps the anchor bracket and the floor panel, wherein a part of the flange portion is separated from the floor panel and forms a space with the floor panel.

3. The fastening structure according to claim 1, further comprising:
   a cross member which extends in a vehicle width direction and which forms a cross space which is a closed space with the floor panel; and
   a bulk disposed in the cross space and spanned between a front wall of the cross member and a rear wall of the cross member,
   wherein the tank bracket is joined to the cross member, and
   the bulk is adjacent to the tank bracket in the front-rear direction.

4. The fastening structure according to claim 3, wherein the tank bracket is located on the front side of the cross member,
   a front end position of the anchor bracket is the same as a front end position of the tank bracket, and
   a distance from the fastening portion to a front end of the main bracket equals to a distance from the fastening portion to the front end of the tank bracket.

* * * * *